United States Patent [19]
Maki

[11] 3,867,886
[45] Feb. 25, 1975

[54] APPARATUS FOR LEVITATING AND STABILIZING A VEHICLE DRIVEN BY A LINEAR MOTOR

[75] Inventor: Naoki Maki, Ibaraki-ken, Japan

[73] Assignee: Hitachi, Ltd., Tokyo, Japan

[22] Filed: June 6, 1973

[21] Appl. No.: 367,405

[30] Foreign Application Priority Data
June 15, 1972 Japan.............................. 47-59688

[52] U.S. Cl..................... 104/148 SS, 104/148 MS
[51] Int. Cl............................................ B61b 13/08
[58] Field of Search............... 104/148 SS, 148 MS; 308/10

[56] References Cited
UNITED STATES PATENTS
3,470,828  10/1969  Powell, Jr. et al............. 104/148 SS Primary Examiner—M. Henson Wood, Jr.
Assistant Examiner—Reinhard J. Eisenzopf
Attorney, Agent, or Firm—Craig & Antonelli

[57] ABSTRACT

In an apparatus for driving a vehicle at super high speeds, a ground winding is disposed horizontally and super-conducting windings are mounted on the vehicle to be driven, the super-conducting windings being disposed on both sides of the stabilizing winding belonging to the ground winding and substantially in a horizontal plane where the stabilizing winding lies whereby the vehicle is levitated and stabilized by such windings.

4 Claims, 6 Drawing Figures

APPARATUS FOR LEVITATING AND STABILIZING A VEHICLE DRIVEN BY A LINEAR MOTOR

The present invention relates to an apparatus for driving a vehicle at super high speeds and more particularly to an apparatus which levitates the vehicle by a magnetic repulsion force and frictionlessly drives it with the aid of a linear motor.

An apparatus to drive a vehicle at a super high speed of 550 Km/h has now been proposed in which the vehicle is levitated by a magnetic repulsion force exerted between a super-conducting winding mounted on the vehicle and a short-circuited winding or a conductive sheet disposed on the ground and driven frictionlessly by means of a linear motor. This apparatus, however, has such drawbacks as follows: The number of windings to be used for propulsion, levitation and stabilization are large if they are arranged in a conventional manner, so that the overall weight of the vehicle is great and the cost thereof is also high.

In order to eliminate the above described drawback, therefore, there must be provided an apparatus which includes a propeller, a levitator and a stabilizer and is constructed rather economically with a small number of windings.

Accordingly, it is an object of the present invention to provide an apparatus to drive a vehicle at a super high speed, which is light in weight and economical in cost.

Another object of the present invention is to provide an apparatus to drive a vehicle at a super high speed, in which a ground winding is disposed horizontally and super-conducting windings are mounted on the vehicle to be driven in such a manner that the super-conducting windings are disposed on both sides of the stabilizing winding belonging to the ground winding and substantially in a horizontal plane where the stabilizing winding lies.

Other objects and the features of the present invention will become more apparent if the following description is read in conjunction with the attached drawings, wherein FIG. 1 shows schematically in cross section a conventional apparatus for driving a vehicle at a super high speed;

Figure 1:
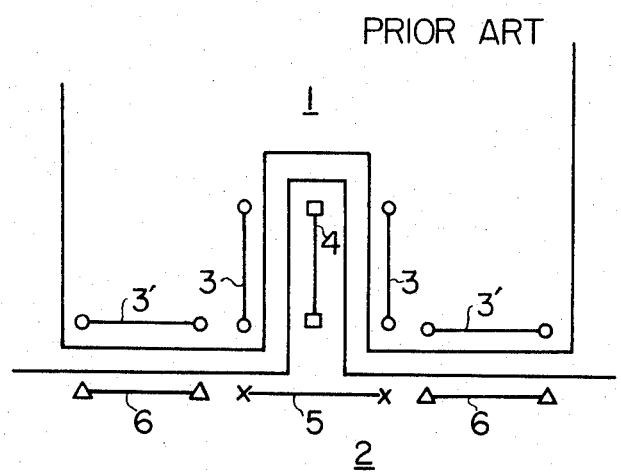

In the first place, the conventional apparatus for driving a vehicle at a super high speed will be described with the aid of FIGS. 1 and 2. This apparatus uses a linear motor having a super-conducting winding, in which, as shown in FIG. 1, the restoring force and the levitating force can be obtained through the interaction between the magnetic flux generated by a super-conducting winding 3 mounted on a vehicle 1 and the current induced in such short-circuited windings (or conductive sheets) disposed on the ground as a stabilizing winding 4 and a levitating winding 6 while the propelling force can be produced due to the interaction between the magnetic flux generated by the super-conducting winding 3 and the travelling magnetic flux wave synchronized with the speed of the vehicle, generated by a propelling winding 5 consisting of rectangular coils and excited by an external three-phase power source.

Now, the relative disposition of the individual windings will be explained with reference to FIG. 1. The vehicle 1 has a concave recess or guide groove extending along the lengthwise direction of the vehicle and a mating protrusion or guide rail is so provided on the ground that the guide rail may be fitted in the guide groove with an air gap therebetween. The stabilizing winding 4 is provided vertically in the guide rail. The super-conducting windings 3 are mounted on the vehicle on both sides of and parallel to the stabilizing winding 4 and further super-conducting windings 3' are provided on the vehicle 1 near and perpendicular to the super-conducting windings 3. The levitating windings 6 are disposed on the ground, opposite and parallel to the super-conducting windings 3'. The propelling winding 5 is disposed on the ground, between the levitating windings 6 and in perpendicular relation to the stabilizing winding 4.

Figure 2:
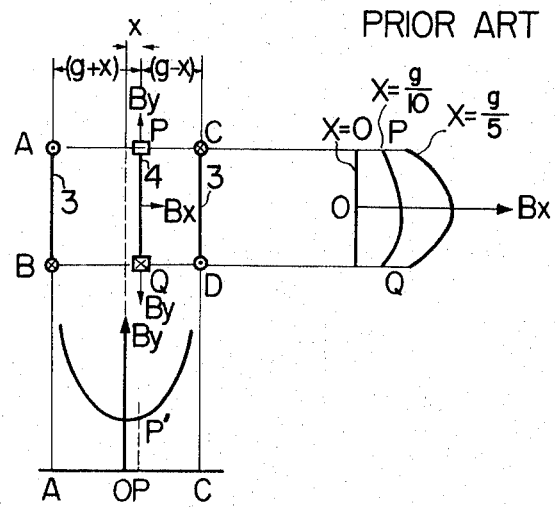
FIG. 2 shows the distribution of magnetic flux in the apparatus shown in FIG. 1.

FIG. 2 shows the distribution of the magnetic flux density linking the stabilizing winding 4 in FIG. 1 and the restoring force acting on the winding 4 can be explained with the aid of this figure.

The horizontal, lateral flux density $Bx$ generated by the coils A–B and C–D of the superconducting windings 3 is distributed as shown in the right top of FIG. 2. Accordingly, the flux $\Phi x$ linking the stabilizing winding 4 along the width P–Q thereof induces a voltage across the winding 4 and current $Ia$ flows through the short-circuited stabilizing winding (or conductive sheet). The current $Ia$ assumes such a direction that the resulting field may cancel the field generated by the super-conducting windings and the magnitude of the current $Ia$ is proportional to the displacement $x$ since the induced voltage is also proportional to the displacement $x$ in a range where the displacement is small. Here, the term "displacement" is referred to the distance of deviation of the center of the vehicle (or the middle plane between the windings 3) from the plane in which the stabilizing coil 4 lies. The flux density $By$ generated perpendicularly by the super-conducting windings which links the coil sides P and Q of the stabilizing winding 4 is distributed as shown in the left bottom of FIG. 2. Accordingly, the restoring force can be produced due to the interaction between the flux density $By$ ($\overline{PP'}$ in FIG. 2) and the induced current $Ia$. When the displacement $x$ is zero, the density of the flux linking the stabilizing winding 4 vanishes uniformly. Consequently, no voltage (therefore no current) will be induced and the restoring force vanishes with an advantage of zero copper loss (i.e., drag force). If there is any displacement, then linking flux, an induced voltage and current and a restoring force are generated all in proportion to he displacement $x$.

With this arrangement of the windings, the vehicle can be levitated, propelled and stabilized, but in this structure four super-conducting windings 3 and 3' must be mounted on the vehicle 1 with the associated parts. Therefore, four units of such parts as cryostats and their attachments must be mounted on the vehicle so that the total weight of the vehicle is great. The heavier is the weight of the vehicle 1 the larger is to be set the levitating force. This one of the drawbacks encountered by the conventional apparatus.

According to the present invention which has been made to eliminate above mentioned drawbacks, the stabilizing winding is disposed horizontally between those super-conducting windings on the vehicle which lie horizontally.

Figure 3:
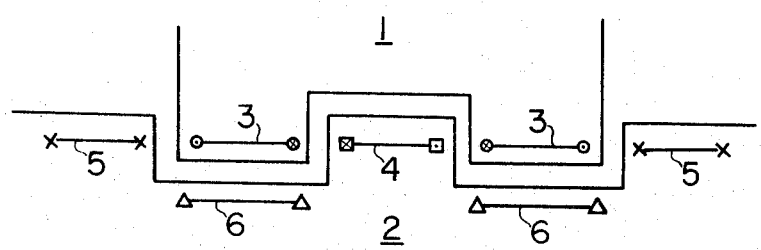
FIG. 3 shows schematically in cross section an apparatus for driving a vehicle at a super high speed, constructed according to the present invention.

One embodiment of the present invention will be described with the aid of FIGS. 3 and 4. In FIG. 3, a vehicle 1 has super-conducting windings 3, provided on both sides in the bottom thereof, which lie in one and the same horizontal plane and levitating windings (or conductive sheets) 6 are disposed on the ground 2, opposite to the respective super-conducting windings 3. Propelling windings 5 are also disposed on the ground 2, on outer sides of the respective levitating windings 6 and substantially in the same horizontal plane as contains the super-conducting windings 3 on the vehicle. 1. A stabilizing winding (or conductive sheets) 4 is disposed on the ground 2, between the levitating windings 6 and substantially in the same horizontal plane as contains the super-conducting windings 3 and the propelling windings 5.

Figure 4:
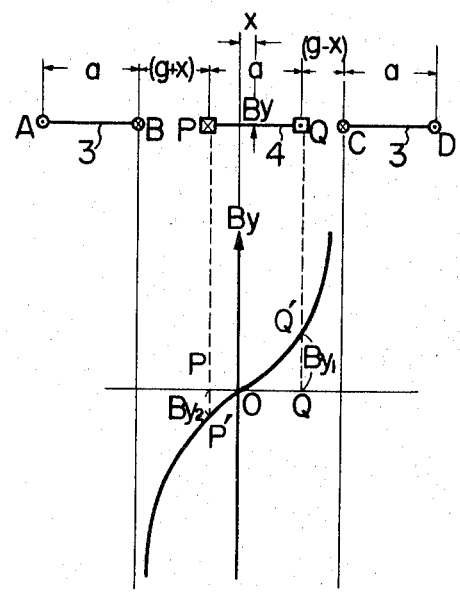
FIG. 4 shows the distribution of magnetic flux in the apparatus shown in FIG. 3.

FIG. 4 shows the distribution of the flux density linking the stabilizing winding 4 shown in FIG. 3. In FIG. 4, the abscissa gives the space distance from the center of the stabilizing winding 4 and the ordinate the distributed flux density, where the manner or graduation, i.e., the coordinate values, is the same as in the ordinary rectangular coordinate system. If the displacement $x$ of the center of the vehicle 1 with respect to the middle point of the width P–Q of the stabilizing winding 4 is zero, the flux generated by the winding A–B cancels the flux generated by the winding C–D, as seen in FIG. 4. In this case, the flux linking the winding 4 vanishes so that both the restoring force and the drag force will vanish. If, on the other hand, there is any displacement $x$, the positive flux density $By_1$ does not offset the negative flux density $By_2$. Consequently, there is some flux linking the winding 4 so that a current is induced through the winding 4. And the restoring force can be produced due to the interaction between the induced current and the difference of the flux densities $By_1 - By_2$.

The restoring force thus developed will be described in further details. It is assumed in FIG. 4 that the widths A – B and C – C of the super-conducting winding 3 and the width P – Q of the stabilizing winding 4 are all equal to $a$, that each length of the respective gaps B – P and C – Q is $g$ when there is no displacement of the center of the vehicle 1, and that the vehicle 1 has been displaced by a distance of $x$ as in FIG. 4.

The length of each super-conducting winding 3 is sufficiently great in comparison with its width A – B or C – D and, therefore, it is possible to assume a super-conducting winding having an infinite length. Under this supposition, the vertical flux density By generated by the super-conducting windings 3 (A – B and C – D) is distributed as shown in FIG. 4 and the flux $\Phi y$ linking the unit length of the stabilizing winding 4 (P – Q) can be given according to Biot-Savart's law by the expression:

$$\Phi y = \mu_0 Is/2\pi \ \{\log_e ((a+g-x)/(g-x)^2 - \log_e ((2a+g-x)/(a+g-x)^2 - \log_e ((a+g+x)/(g+x))^2 + \log_e ((2a+g+x)/(a+g+x))^2\} \quad (1)$$

where $Is$ is the mmf of each super-conducting winding and $\mu_o$ the magnetic permeability of air.

Therefore, the current $I$ induced in the short-circuited stabilizing winding 4 is expressed by the differential equation:

$$RI + L(dI/dt) = N(d\Phi y/dt) \quad (2)$$

where $R$, $L$ and $N$ are the resistance, inductance and number of turns of the stabilizing winding 4, respectively. Since the reactance drop is generally greater than the resistance drop, it follows that $RI << L(dI/dt)$. And since $I = 0$ for $\Phi = 0$, the current induced through the winding 4 is given by the expression:

$$I = N\Phi/L \quad (3)$$

The densities $By_1$ and $By_2$ of the vertical flux linking the stabilizing coil 4 at the portions P and Q are given respectively by the following expressions:

$$By_1 = \mu_0 Is/2x[1/(g+x) - 1/(a+g+x)] \quad (4)$$

$$By_2 = \mu_0 Is/2x[1/(1/g-x) - 1/(a+g-x) \quad (5)$$

Since the restoring force $F$ per unit length of the stabilizing winding 1 is produced due to the interaction between the induced current expressed by the formula (3) and the magnetic flux densities expressed by the formulae (4) and (5), it follows from the formulae (1), (3), (4) and (5) that $$F = 4 \cdot N^2/L \ (\mu_0 Is/2\pi)^2 \ \{1/(g-x) - 1/(a+g-x) + 1/(g+x) - 1/(a+g+x)\} \log_e[(g+x)(a+g-x)^2(2a+g+x)]/[(g-x)(a+g+x)^2(2a+g-x)] \quad (6)$$

If it is assumed in the formula (6) that $a, g >> x$, then it follows that $$F = N^2/L \ (\mu_0 Is/2\pi)^2 \cdot 16a^3/[g^2(a+g)^2(2a+g) \cdot x] \quad (7)$$

Assume, for example, that $Is = 500$ Kat, $a = 0.8$ m, and $g = 0.25$ m and that the stabilizing winding 4 is a rectangular coil 3 m $\times$ 0.8 m formed of conductor 3.5 cm $\times$ 6.5 cm with the number of poles for a single vehicle equal to 8 (= 4 poles $\times$ 2 rows), then it follows that $L/N^2 = 4 \times 10^{-7} \times [3 \log_e (2 \times 3 \times 0.8)/[0.1 \times (3 + \sqrt{3^2 + 0.8^2})] + 0.8 \log_e (2 \times 3 \times 0.8)/[0.1 \times (0.8 + \sqrt{3^2 + 0.8^2})] + 2 \sqrt{3^2 + 0.8^2} - 3 + 0.8/2] = 3.21 \times 10^{-6} \ (H)$ and therefore one obtains the magnitude of the restoring force per vehicle such that $F = (2 \times 0 \ 10^{-7} \times 500 \times 10^3)^2/(3.21 \times 10^{-6}) \cdot (16 \times 0.8^3 \times 0.05)/(0.25^2 \times 1.05^2 \times 1.85^2) \times 8 \times 1/(9.8 \times 10^3) = 8.2$ t/vehicle As described above, according to the present invention, there is no need for special super-conducting windings which cooperate with the stabilizing winding 4 for the stabilization of the vehicle. Therefore, the number of super-conducting windings can be diminished with their attachments removed so that the total weight of the vehicle can be reduced and so that the apparatus for driving the vehicle is very economical.

Figure 5:
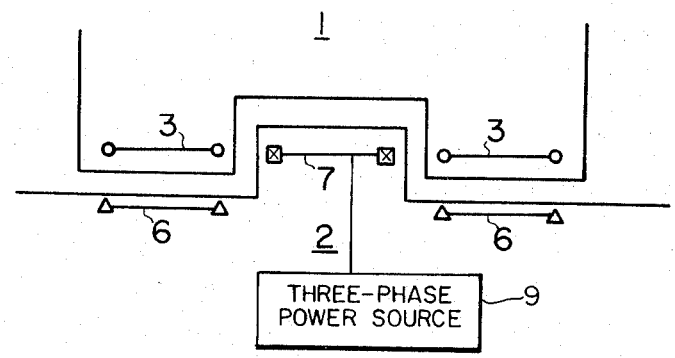
FIGS. 5 and 6 show other embodiments of the present invention.
Figure 6:
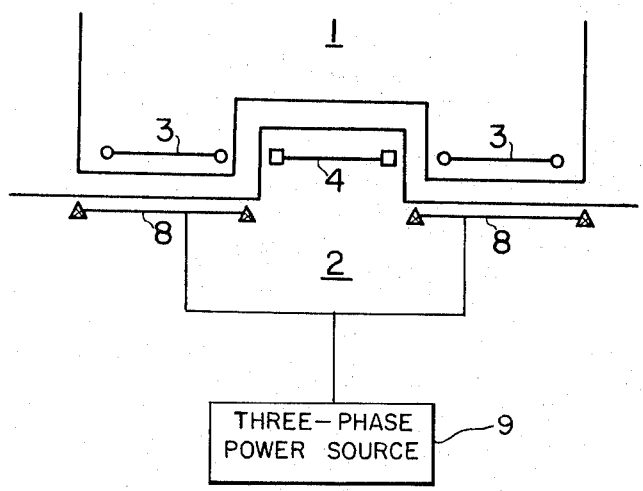

FIGS. 5 and 6 show further embodiments of the present invention and the arrangement of the windings on the vehicle 1 and on the ground 2 in each of the embodiments is the same as in the previous embodiment shown in FIG. 3, except for that of the propelling winding 5. The notable feature of the embodiment shown in FIG. 5 is the provision of a stabilizing winding 7 disposed on the ground 2, between the levitating windings 6 on the vehicle 1 and in the same horizontal plane as contain the windings 3. The winding 7 draws a leading current from an external three-phase power source 9 so that it may produce not only the restoring force but also the propelling force. Thus, the winding 7 serves as a propelling and stabilizing winding. The basic conception of the relative disposition of the super-conducting windings and the stabilizing winding, however, remains the same as in he embodiment shown in FIG. 3.

In the embodiment shown in FIG. 6, the characteristic is the provision of levitating windings 8 disposed on the ground 2, opposite to the super-conducting conducting windings 3 on the vehicle 1. The windings 8 produces the propelling force as well as the levitating force by drawing a leading current from an external three-phase power source 9. Thus, the windings 8 serve as levitating and propelling windings. The basic conception of the disposition of the other windings are the same as in the embodiments shown in FIGS. 3 and 5.

With these arrangements of windings according to the embodiments shown in FIGS. 5 and 6, the number of the super-conducting windings to be mounted on the vehicle 1 can be halved and also the number of windings to be disposed on the ground 2 can be diminished, so that there can be provided an economical apparatus for driving a vehicle at super high speed.

As described above, according to the present invention, the number of super-conducting windings to be mounted on the vehicle can be lessened by horizontally disposing various windings to be arranged on the ground and by mounting super-conducting windings on the vehicle, on both sides of the stabilizing winding of the windings on the ground and in the same horizontal plane as contains the stabilizing winding. In this way, the attachments associated with the unnecessary super-conducting windings can also be removed so that the weight of the vehicle can be lessened, that the levitating force can be set smaller accordingly, and that the cost of the apparatus can be rendered less expensive. Moreover, since the super-conducting windings to especially cooperate with the stabilizing winding for the stabilization of the vehicle, can be eliminated, the magnetic flux generated by the super-conducting windings and penetrating the passenger room can be decreased. Therefore, the magnetic shielding of the passenger room can be much more easily facilitated. Moreover, since, according to the present invention, all the windings are disposed horizontally, the work of winding installation can be rather more easily performed while the windings can be more securely supported with this arrangement.

What is claimed is:

1. An apparatus for levitating and stabilizing a vehicle driven by a linear motor, comprising ground windings disposed horizontally on the ground including a stabilizing winding and levitating windings; and super-conducting windings mounted on said vehicle, opposite to said levitating windings and on both sides of said stabilizing winding and substantially in the same horizontal plane as contains said stabilizing winding; whereby vehicle is levitated and stabilized by means of said windings.

2. An apparatus as claimed in claim 1, wherein said ground disposed windings further include propelling windings disposed on he outer sides of said levitating windings and substantially in the same horizontal plane as contains said super-conducting windings.

3. An apparatus as claimed in claim 1, further comprising external three-phase power source means for supplying a leading current through said stabilizing winding, said stabilizing winding being energized by the leading current for providing a propelling force as well s a restoring force.

4. An apparatus as claimed in claim 1 further comprising external three-phase power source means for supplying a leading current through said levitating windings, said levitating windings being energized by the leading current for providing a propelling force as well as a levitating force.

* * * * *